Inventor
SAMUEL M. SHOBERT
JOSEPH K. TUNIS III
by Hood, Gust, Irish & Lundy,
Attorneys 3,560,065
REINFORCED PLASTIC BEARING
Samuel M. Shobert, Mishawaka, and Joseph K. Tunis III, South Bend, Ind., assignors to Plas-Steel Products, Incorporated, Walkerton, Ind., a corporation of Indiana
Filed Feb. 5, 1968, Ser. No. 703,067
Int. Cl. F16c 27/00; F02f 5/10
U.S. Cl. 308—238   4 Claims

ABSTRACT OF THE DISCLOSURE

A reinforced plastic bearing comprising a generally toric core of glass strands disposed in a resin material, and a tubular layer of tetrafluoroethylene-cotton threads embedded in a resin material and enrobing the core to provide an exterior surface including the tetrafluoroethylene fibers of the embedded threads. Preferably, the resin material embedding the tetrafluoroethylene-cotton threads is loaded with finely divided particles of tetrafluoroethylene impregnating the cotton fibers of the embedded threads.

The preferred method for fabricating such a bearing comprises the steps of arranging the glass strands to provide an elongated bundle having a circular cross section and impregnating the strands with resin, arranging the tetrafluoroethylene-cotton threads peripherally about the bundle, helically wrapping the bundle with the threads thereon about a cylindrical mandrel, curing the resin, and cutting the helically wrapped bundle axially along the mandrel to separate the bearings.

BACKGROUND OF THE INVENTION

Field of the invention

The present invention relates to annular bearings, and more particularly to the provision of a reinforced plastic, generally toric bearing and a method for making same. The bearing of the present invention comprises a generally toric core of glass strands disposed in a resin material, the core being covered with a tubular layer of tetrafluoroethylene-cotton threads, the tetrafluoroethylene fibers of which provide a highly lubricous surface.

Description of the prior art

Reinforced plastic bearings are known. See, for instance, Shobert Pat. 3,131,979, issued May 5, 1964, which shows a hollow cylindrical bearing which is conventionally used to support the shafts of small electric motors.

The above-referred to Shobert patent also discloses the use of tetrafluoroethylene-cotton threads to provide a highly lubricous surface.

Further, it is known to use tetrafluoroethylene (Teflon) to provide a bearing surface. Tetrafluoroethylene is an excellent bearing material from the standpoints of both lubricity and wear. However, a solid or substantially solid tetrafluoroethylene bearing is dimensionally unstable in that it deforms under load since it possesses, as do other plastic materials, a certain flow which causes the structure to change shape when loads are applied thereto. Additionally, tetrafluoroethylene is quite expensive.

SUMMARY OF THE INVENTION

The present invention comprises both a reinforced plastic annular bearing and a method for making the bearing. The bearing of the present invention comprises a generally annular core of glass strands disposed in a resin material, the core preferably having a circular cross section, and a layer of tetrafluoroethylene-cotton threads embedded in a resin material and enclosing the core to provide an exterior surface including the tetrafluoroethylene fibers of the embedded threads.

In a preferred embodiment of the present invention, the resin which embeds the tetrafluoroethylene-cotton threads is loaded with finely divided particles of tetrafluoroethylene impregnating the cotton fibers of the embedded threads. The resin containing the particles of tetrafluoroethylene will thorough impregnate the interstices of the layer of threads and the cotton fibers of the threads. The tetrafluoroethylene fibers will not be wetted by the resin material. The tetrafluoroethylene fibers are thus embedded by the impregnated, interlocked fibers of cotton. The lubricity of the outer surface of this layer of threads, therefore, is provided by the lubrious qualities of the tetrafluoroethylene fibers exposed on the surface as well as of the tetrafluoroethylene particles in the resin which embeds the tetrafluoroethylene fibers.

Such annular bearing is very useful, for example, as an antifriction means disposed between two adjacent, relatively rotatable surfaces, at least one of which is provided with a concentric groove for receiving the bearing.

The method of the present invention comprises the steps of arranging glass strands impregnated with liquid, heat-hardenable resin into a bundle having a circular cross-section, arranging the tetrafluoroethylene-cotton threads peripherally about the bundle, helically wrapping the bundle with the threads thereon about a cylindrical mandrel, curing the resin, and cutting the helically wrapped bundle axially along the mandrel to separate the bearings. The cotton fibers in the thread will, in one embodiment, be impregnated by the resin impregnating the glass strands about which the threads are arranged.

Preferably, the method of the present invention further comprises the steps of impregnating the tetrafluoroethylene-cotton threads with a resin in liquid state with finely divided particles of tetrafluoroethylene in substantially homogeneous suspension until the cotton fibers of the threads are thoroughly impregnated with the resin suspension.

The bearing of the present invention possesses the characteristics of excellent wear, low friction, and dimensional stability and yet is economical. The tetrafluoroethylene fibers in the tetrafluoroethylene cotton threads plus the finely divided particles of tetrafluoroethylene in the resin provide a highly lubricous bearing surface.

It is an object of the present invention therefore to provide a bearing haaing as one of its constituents the lubricous plastic material tetrafluoroethylene in a structure which satisfies the requirement of wear-life, lubricity, dimensional stability, economy and compression strength.

Another object of this invention is to provide such a bearing structure which has as one of its elements threads composed of the staple fibers of both cotton and tetrafluoroethylene so interlocked together as to provide a lubricous bearing surface plus a binding resin material including finely divided particles of tetrafluoroethylene, which resin material impregnates the interlocked fibers of cotton and surrounds and embeds the tetrafluoroethylene fibers.

Still another object of the present invention is to provide a method for fabricating such a bearing, which method comprises the steps of forming an elongated core of glass strands disposed in a resin material and enrobed in a tubular layer of tetrafluoroethylene-cotton threads, helically wrapping the enrobed bundle about a cylindrical mandrel, curing the resin and then cutting the helically wrapped bundle axially along the mandrel to separate the bearings. It will be apparent that the bearings so formed will each be helically formed in much the same manner as a helical, split, lock washer. As will be described hereinafter, each bearing will be resilient.

Other objects and features of the present invention will become apparent as this description progresses.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein.

DESCRIPTION OF THE PREFERRED EMBODIMENT

Figure 1:
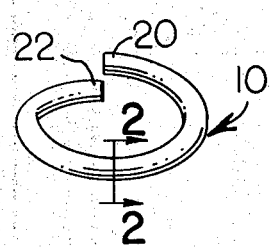
FIG. 1 is a perspective illustration of a bearing constructed in accordance with this invention.
Figure 2:
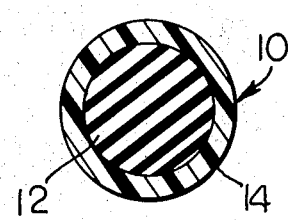
FIG. 2 is an enlarged, sectional view taken from FIG. 1 generally along the line 2—2.
Figure 3:
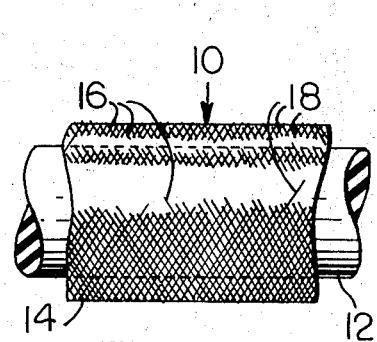
FIG. 3 is an enlarged, fragmentary view showing a portion of the bearing and specifically the braided surface thereof.

Referring to the drawings, and particularly to FIGS. 1, 2 and 3, it will be seen that the loop-shaped or annular bearing of the present invention, indicated generally by reference numeral 10, comprises an inner core 12 having a circular cross-section and a tubular covering 14 peripherally enclosing the core 12 throughout its length. The core 12 comprises a plurality of generally parallel glass strands or threads embedded in a resin material. The core 12 is preferably formed by continuously drawing a plurality of glass threads through a bath of liquid, heat-hardenable resin such as polyester or epoxy, gathering the threads into a rod-like bundle, compressing the bundle into a predetermined cross-sectional shape and size, preferably circular, and then curing the resin. Suitable method, apparatus and materials for forming such a glass reinforced plastic core 12 are fully disclosed in Meek Pat. 2,684,318, issued July 20, 1954, Shobert Pat. 3,281,299 and Shobert Pat. 3,131,979.

The covering 14 comprises a plurality of tetrafluoroethylene-cotton threads embedded in a resin material, which resin material preferably is loaded with finely divided particles of tetrafluoroethylene. The tetrafluoroethylene-cotton thread is preferably composed of the staple fibers of cotton and tetrafluoroethylene which are physically interlocked and twisted together into a unitary thread. The proportion of tetrafluoroethylene and cotton is preferably about half and half, there being a multiplicity of tiny fibers approximately three inches long constituting the tetrafluoroethylene and fibers of cotton about one and one-half inches long constituting the cotton component. Preferably, the tubular covering 14 is constituted primarily of the tetrafluoroethylene-cotton thread in the form of a helical braid, as shown in FIG. 3, the thread being at a single two and five-eighths run size of about forty-two hundred yards per pound. The thread may be braided directly upon a wet coating of tetrafluoroethylene-filled resin, and the braid be in the form of a woven fabric encasement intimately surrounding the core 12.

The pattern of the braid or fabric of the covering 14 is illustrated in FIG. 3 and is shown as comprising a plurality of threads 16 and 18 which are criss-crossed in woven relationship with each of threads 16 and 18 alternately passing over and under each other. Each thread 16, 18 follows the form of a helix from one end of the bearing 10 to the other. That is, the threads 16 extend in the form of a helix in one circumferential direction about the core 12 and the threads 18 extend in the form of a helix in the opposite circumferential direction about the core 12 alternately over and under the threads 16.

Although the threads 16 and 18 are helically braided in the illustrative embodiment of this invention, it will be apparent that the threads may be arranged in some other manner about the core 12 to form the covering 14, a woven, seamless tube being an example.

The filled resin embedding the tetrafluoroethylene-cotton threads 16 and 18 wets and impregnates the cotton fibers of the thread but does not wet or impregnate the tetrafluoroethylene fibers. The exterior surface of the covering 14, therefore, comprises tiny islands of tetrafluoroethylene fibers surrounded and partially embedded in the resin which is filled with microscopic particles of tetrafluoroethylene some of which are also at least partially exposed. The tetrafluoroethylene fibers and particles produce a highly lubricous surface. It will be understood that, although maximum lubricity is obtained when the threads 16 and 18 are embedded in the tetrafluoroethylene-filled resin, the threads 16 and 18 may be embedded in the same resin or the same type of resin forming the core 12. In such a case, the tetrafluoroethylene fibers of the threads 16 and 18, which fibers are not wetted or impregnated by the resin, will provide the multitude of tiny lubricous islands on the exterior surface of the covering 14.

Because of the method in which the bearing 10 is preferably fabricated, the ends 20 and 22 of the bearing (FIG. 1) will be slightly spaced apart in much the same manner as the ends of a split, helical lockwasher. That is, since in the preferred method of fabrication, the bearing 10 is formed by helically wrapping the core 12 and its covering 14 about a helically grooved cylindrical mandrel, the ends 20 and 22 are spaced apart (in the direction of the mandrel axis) by a distance at least equal to the cross-sectional diameter of the bearing.

When the bearing 10 is used between two relatively rotatable plates as mentioned previously, the ends 20 and 22 will be flexed axially toward alignment. It will be understood that the core 12 and its tubular covering 14 are resilient as discussed in the above-referred to Meek patent and, therefore, deformation of the bearing 10 to bring its ends 20 and 22 into alignment will not damage the bearing. That is, the bearing 10 is a resilient, reinforced plastic bearing in that the glass strands or threads are merely used as reinforcing for the inherently resilient, cured resin comprising the core 12. The covering 14 is provided so that the bearing 10 will have a highly lubricous exterior surface.

The glass threads used in the core 12 preferably are of the glass yarn type, each thread being composed of a multiplicity of tiny elongated fibers which, in effect, when bundled together, form the final continuous length of thread. Alternatively, this thread may consist of a plurality of glass strands or threads or still further be in the form of roving without departing from the scope of this invention.

As will now be apparent, the core 12 and its covering 14 are intimately and rigidly bonded together by means of the resin material in the core and the covering. In one form of the present invention, i.e., the form in which the tetrafluoroethylene-filled resin is not utilized, the tetrafluoroethylene-cotton threads 16 and 18 are braided about the core 12 while the resin in the core 12 is in liquid form and has not been cured. In such a case, the resin material in the core 12 will impregnate and wet the cotton fibers of the threads 16 and 18. It will be understood that the thickness of the covering 14 is determined by the thickness of the threads 16 and 18, because, preferably, only one layer of braided threads 16 and 18 is applied to the core 12.

Figures 4A, 4B:
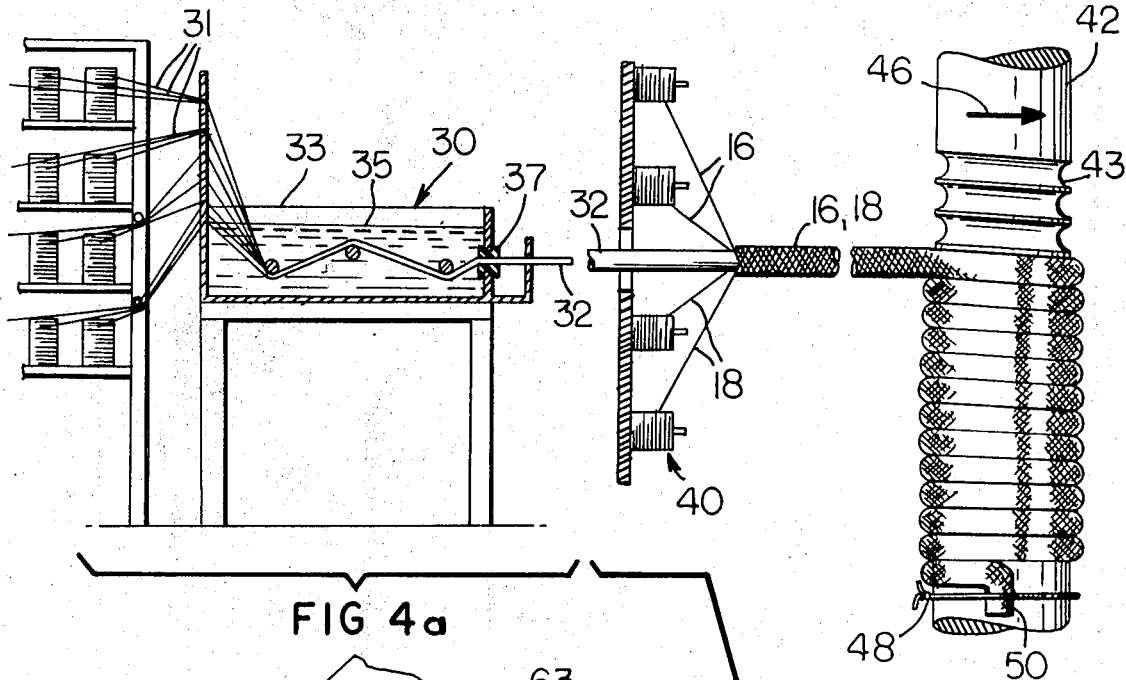
FIGS. 4a and 4b illustrate a somewhat diagrammatical view illustrating the steps of the method of the present invention.
Figure 5:
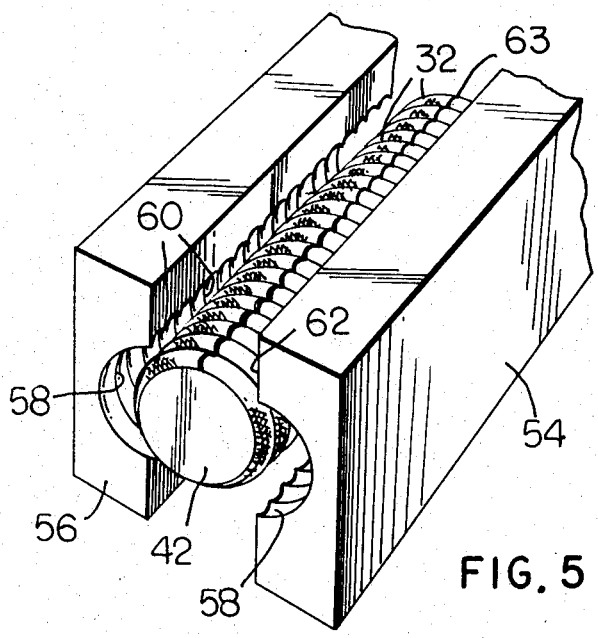
FIG. 5 is a fragmentary, perspective view showing a finishing mold and one method for separating the individual annular bearings.

Referring now to FIGS. 4 and 5, the method of the present invention will be discussed.

In FIG. 4, reference numeral 30 indicates generally an extruding apparatus for providing continuously a compacted bundle 32 of longitudinally extending glass threads or strands 31 of the type discussed above. This apparatus 30 may take any number of suitable forms, but preferably is of the type disclosed in detail in Shobert Pat. No.

3,281,299. A plurality of travelling, glass threads 31 are gathered into bundle 32 having the desired cross sectional shape and size, keeping, at all times, these threads in tension. Preferably, this apparatus 30 includes an elongated vat 33 containing liquid resin 35, and a die 37 through which the glass threads 31 are drawn and gathered into compacted bundle 32.

For one method of this invention, experimentation has shown that by volume, the liquid bath 35 may contain a percentage of tetrafluoroethylene particles ranging from 20% to 50% of the liquid in the vat 33. By way of upper and lower limits of tetrafluoroethylene content, too much such content will result in destroying the physical, matrix or encapsulating characteristics of the resin thereby leading to dimensional instability of the entrained tetrafluoroethylene. Thus, a low enough concentration of tetrafluoroethylene must be used as will permit retention of the encapsulating, matrix characteristics of the resin whereby the tetrafluoroethylene fibers and particles are securely held in place such that they remaining dimensionally stable under load. Polyester resin is one preferred resin.

If too small an amount of tetrafluoroethylene particles are used, the necessary lubrication qualities in the bearing are lost.

With respect to the size of the tetrafluoroethylene particles, these preferably are about one micron in diameter or less. However, it will appear to a person skilled in the art, that this size can be varied keeping in mind that if they become too large, the conglomerate of tetrafluoroethylene material will become dimensionally unstable.

While the threads 16 and 18 have been described as being tetrafluoroethylene-cotton, it should be also recognized that material other than cotton may be used so long as the encapsulating and securing characteristics of the resin are not interfered with.

The coated bundle 32 leaving the die 37 is passed through a braiding mechanism, indicated generally by the reference numeral 40, which is arranged to braid helically the tetrafluoroethylene-cotton threads 16 and 18 about the bundle 32. This braiding mechanism 40 may take the form shown in Shobert Pat. 3,131,979 or 3,033,729.

It will be understood by those familiar with the fiber glass reinforced plastic art that the bundle 32 leaving the apparatus 30 is somewhat stiff and substantially self-supporting. Excess wet resin on the bundle 32 exudes through the braid impregnating the threads 16, 18.

After the bundle 32 with the braid 14 thereon leaves the braiding mechanism 40, it is helically wrapped about a rotating cylindrical mandrel 42 provided with a helical groove 43, the cross-sectional shape of this groove 43 being semicircular. Suitable means, such as a wrapping of twine as indicated generally by the reference numeral 48, is provided for fastening one end 50 of the bundle 32 to the mandrel 42 so that the bundle will be wrapped about the mandrel as it is rotated.

After a desired number of turns of the bundle 32 are wrapped onto the mandrel 42, the bundle is cut. If additional impregnant is desired in the braid 14, the wrapped mandrel 42 is immersed in the bath 35 or one like it, and then drained. The mandrel 42 with a wrapped bundle 32 thereon is next placed between a pair of die halves 54, 56 as shown in FIG. 5. Each die half 54, 56 is formed with a longitudinally extending, half-cylindrical cutout 58 which, when the die halves are brought together, provide a cavity shaped to receive the mandrel 42 with the bundle 32 thereon. Each half-cylindrical portion 56, 58 has generally helically extending grooves 60 which intimately match the turns of the bundle 32. Thus, the turns of the bundle 32 are encased in a mold, one part of the mold being the groove 43 and the mandrel 42 and the other part of the mold being the separable die 54, 56. The wrapped mandrel is placed in a curing oven indicated generally by the reference numeral 52. This curing oven is also conventional and may be heated, preferably uniformly, by any suitable means such as by electrical strip heaters which extend alongside the mandrel or mandrels placed in the oven. The necessary temperature and the length of time that the mandrel is left in the oven depends upon the curing characteristics of the resin used and is conventionally determined either by experiment or from the resin manufacturer's specifications.

Following curing of the resin, the die halves 54 and 56 are separated and the helical bundle 32 is cut longitudinally along the line indicated by the numeral 62, thereby separating the individual turns of the bundle or helix into individual turns. The cutting operation may be performed while the bundle 32 is on the mandrel, a straight, axially extending groove in the surface of the mandrel accommodating a cutting knife or saw so that the turns can be cut through. Alternatively, the helical bundle 32 can be unscrewed off the mandrel and then cut. Each such separated turn then becomes a generally toric bearing having the structure discussed above in conjunction with FIGS. 1, 2 and 3. It will be apparent that the bundle 32 about which the threads 16, 18 are wrapped forms the generally toric core 12 of each bearing 10 and that the threads 16 and 18 and the tetrafluoroethylene-filled resin compose the covering 14. If the mold surfaces 43, 56, 58 are polished, the surface of the finished bearing 10 will have a corresponding degree of smoothness.

The bearing of the present invention possesses high compressive strength and dimensional stability because the tetrafluoroethylene in the bearing is surrounded and supported by cotton fibers, glass fibers and the resin material. The cotton acts as a diluent in the tetrafluoroethylene-cotton thread, and by use of braiding, only a very thin layer of the thread is applied which not only positions the tetrafluoroethylene fibers on the exterior surface where they should be, but also constitutes an economy in the use of an expensive material. By introducing the finely divided particles of tetrafluoroethylene into the resin material about which the threads 16 and 18 are wrapped, even greater amounts of tetrafluoroethylene are provided to fill the spaces between the braided tetrafluoroethylene-cotton threads.

The preferred resin material is a polyester or epoxy resin. In the fabrication of one preferred bearing of this invention, tetrafluoroethylene particles are added to catalyzed epoxy liquid resin to produce a thixotropic material having a high viscosity. The preferred viscosity of the tetrafluoroethylene-filled resin material is approximately five hundred to one thousand cps.

In most cases, there appears to be no reason to impregnate the glass strands comprising the core 12 with tetrafluoroethylene particles. The core 12 is provided mainly for reasons of strength and dimensional stability and it could be a waste of an expensive material to impregnate the core 12 with tetrafluoroethylene particles. Therefore, the bath 35 may be of the resin only with the tetrafluoroethylene particles omitted. The resin to glass ratio in the bundle 32 is made such that the braid 14 applied thereto will not be impregnated with exudate. After the bundle 32, 14 is wrapped on the mandrel 42, the assembly is immersed in the tetrafluoroethylene-filled resin which impregnates the braid 14 as explained previously.

Alternatively, it is possible to form the bearing precisely as explained using resin having no tetrafluoroethylene therein but the tetrafluoroethylene-cotton thread braided and impregnated. Following cure, the annular bearing 10 is then dipped into a resin bath filled with the tetrafluoroethylene particles to provide additional impregnant and lubricous material on the bearing surface.

While there have been discussed above the principles of this invention in conjunction with specific apparatus, it is to be clearly understood that this description is made by way of example and not as a limitation to the scope of the invention.

What is claimed is:

1. A reinforced plastic bearing comprising an elongated and self-supporting core of glass fibers embedded in a hard resinous material, said core being formed into the shape of a loop, said glass fibers extending generally in parallelism with said core, a layer of lubricous material covering the outer surface of said core, said lubricous material including both fibers of tetrafluoroethylene and a suspension of finely divided particles of tetrafluoroethylene secured in place by a matrix, said matrix including a hard resinous material.

2. The bearing of claim 1 in which said core loop is annular and the core itself is circular in cross-section, said loop being split and having two ends adjacent to each other.

3. The bearing of claim 2 in which said lubricous material includes threads containing fibers of said tetrafluoroethylene and other material which bonds to said matrix material, said threads encircling said core.

4. The bearing of claim 2 wherein the threads compose a fabric and are helically braided about said core, said threads including the staple fibers of cotton and tetrafluoroethylene twisted together.

References Cited

UNITED STATES PATENTS

| | | | |
|---|---|---|---|
| 121,804 | 12/1871 | Murfey | 308—240 |
| 648,687 | 5/1900 | Garlock | 277—216 |
| 1,190,500 | 7/1916 | Allen | 277—223X |
| 1,494,169 | 5/1924 | Johnson | 308—240X |
| 2,330,635 | 9/1943 | Siebel | 277—223 |
| 2,681,257 | 6/1954 | Niesemann | 308—N |
| 2,906,552 | 9/1959 | White | 308—N |
| 2,956,848 | 10/1960 | St. Caair | 277—224 |
| 3,250,556 | 5/1966 | Couch | 308—238 |
| 3,110,530 | 11/1963 | Herman | 308—238 |
| 3,127,224 | 3/1964 | Owens | 308—240 |
| 3,131,979 | 5/1964 | Shobert | 308—238 |
| 3,151,015 | 9/1964 | Griffith | 308—238X |
| 3,167,366 | 1/1965 | Freund | 308—238 |
| 3,238,601 | 3/1966 | White | 308—238 |
| 3,250,554 | 5/1966 | Roode | 287—87 |
| 3,350,143 | 10/1967 | Lichowsky | 308—240 |

FOREIGN PATENTS

| | | | |
|---|---|---|---|
| 492,141 | 9/1938 | Great Britain | 277—216 |

M. CARY NELSON, Primary Examiner

W. S. RATLIFF, Jr. Assistant Examiner

U.S. Cl. X.R.

277—216